(12) United States Patent
Suzuki et al.

(10) Patent No.: US 11,196,087 B2
(45) Date of Patent: Dec. 7, 2021

(54) NONAQUEOUS ELECTROLYTE CONTAINING PERFLUOROPOLYETHER AND NITRILE COMPOUND, AND SECONDARY BATTERY INCLUDING THE SAME

(71) Applicant: Panasonic Intellectual Property Management Co., Ltd., Osaka (JP)

(72) Inventors: Hirotetsu Suzuki, Osaka (JP); Nobuhiko Hojo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 15/937,808

(22) Filed: Mar. 27, 2018

(65) Prior Publication Data

US 2018/0337430 A1 Nov. 22, 2018

(30) Foreign Application Priority Data

May 19, 2017 (JP) .............................. JP2017-100299
Jun. 7, 2017 (JP) .............................. JP2017-112910

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 50/411* (2021.01);
(Continued)

(58) Field of Classification Search
CPC ......... H01M 10/0569; H01M 10/0568; H01M 10/0525; H01M 2/166; H01M 2/1653;
(Continued)

(56) References Cited

U.S. PATENT DOCUMENTS

2002/0127475 A1 9/2002 Marchionni et al.
2012/0308881 A1* 12/2012 Tokuda ............. H01M 10/0567
429/199

(Continued)

FOREIGN PATENT DOCUMENTS

JP 2002-305023 10/2002
JP 2006-269374 10/2006
WO WO 2004036682 * 4/2004 .......... H01M 10/052

OTHER PUBLICATIONS

Machine English language translation of "Use of Polyfluoride Polyethers" by Boese Olaf et al. in WO 2004036682 (A2)—Apr. 29, 2004 (Year: 2004).*

*Primary Examiner* — Jonathan G Jelsma
*Assistant Examiner* — Omar M Kekia
(74) *Attorney, Agent, or Firm* — McDermott Will and Emery LLP

(57) ABSTRACT

A nonaqueous electrolyte includes a nonaqueous solvent and an alkali metal salt dissolved in the nonaqueous solvent. The nonaqueous solvent contains a perfluoropolyether and a nitrile compound represented by a formula $R^f$—CN, where $R^f$ represents a hydrocarbon group which has a carbon number of 2 to 4 and in which at least one hydrogen atom is substituted with fluorine.

12 Claims, 1 Drawing Sheet

(51) Int. Cl.
*H01M 50/411* (2021.01)
*H01M 50/446* (2021.01)
*H01M 10/0568* (2010.01)

(52) U.S. Cl.
CPC ...... *H01M 50/446* (2021.01); *H01M 10/0568* (2013.01); *H01M 2300/004* (2013.01); *H01M 2300/0034* (2013.01)

(58) Field of Classification Search
CPC ... H01M 2300/004; H01M 2300/0034; H01M 50/446; H01M 50/441
USPC .................................................. 429/326, 199
See application file for complete search history.

(56) References Cited

U.S. PATENT DOCUMENTS

| | | | |
|---|---|---|---|
| 2016/0226102 A1* | 8/2016 | Teran | H01M 10/4235 |
| 2018/0076485 A1* | 3/2018 | Zhang | H01M 10/0569 |

* cited by examiner

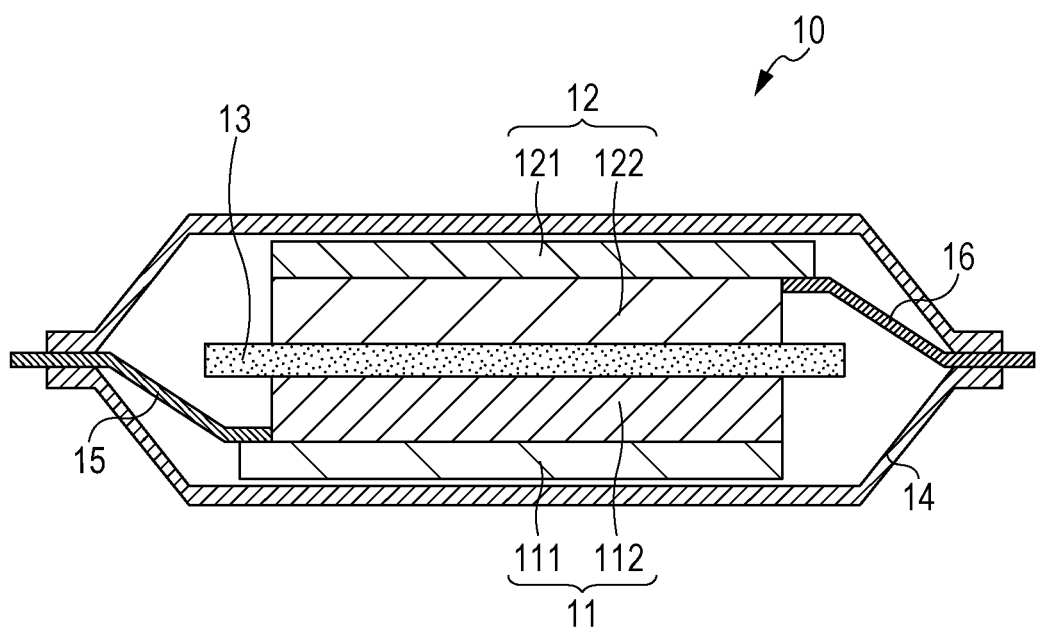

NONAQUEOUS ELECTROLYTE CONTAINING PERFLUOROPOLYETHER AND NITRILE COMPOUND, AND SECONDARY BATTERY INCLUDING THE SAME

BACKGROUND

1. Technical Field

The present disclosure relates to a nonaqueous electrolyte and a secondary battery including the same and, in particular, relates to an improvement in flame retardancy of a nonaqueous electrolyte.

2. Description of the Related Art

To date, perfluoropolyether has been used as a nonaqueous electrolyte additive in batteries. For example, Japanese Unexamined Patent Application Publication No. 2002-305023 and Japanese Unexamined Patent Application Publication No. 2006-269374 disclose that a perfluoropolyether is used for improving the wettability of a nonaqueous electrolyte with respect to the constituents of a battery.

SUMMARY

In one general aspect, the techniques disclosed here feature a nonaqueous electrolyte including a nonaqueous solvent and an alkali metal salt dissolved in the nonaqueous solvent. The nonaqueous solvent contains a perfluoropolyether and a nitrile compound represented by a formula $R^f$—CN, where $R^f$ represents a hydrocarbon group which has a carbon number of 2 to 4 and in which at least one hydrogen atom is substituted with fluorine.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWING

FIGURE is a schematic sectional view showing a secondary battery according to an embodiment of the present disclosure.

DETAILED DESCRIPTION

A nonaqueous electrolyte includes a nonaqueous solvent and an alkali metal salt dissolved in the nonaqueous solvent. In general, perfluoropolyether (PFPE) has low polarity because fluorine atoms having large electronegativity are included. Consequently, PFPE has low solubility of alkali metal salts and does not readily enter between molecules of polar organic solvents having large intermolecular forces. That is, the compatibility between PFPE and polar organic solvents is low, and the two are hardly homogeneously mixed with each other. As a result, the electrical conductivity of a nonaqueous electrolyte containing a polar organic solvent and PFPE as the nonaqueous solvent tends to be low. Therefore, from the viewpoint of maintaining the performance of an electrolyte, it is difficult to add a certain proportion or more (for example, 5 percent by volume or more) of PFPE to a nonaqueous solvent. Meanwhile, if the content of PFPE in a nonaqueous solvent is about 5 percent by volume, the flame retardancy of the nonaqueous electrolyte is not sufficient.

Regarding the polar organic solvent, a specific nitrile compound containing fluorine atoms (hereafter referred to as a fluorinated nitrile) is used. Both the fluorinated nitrile and PFPE contain fluorine atoms and, therefore interact with each other. Consequently, the fluorinated nitrile and PFPE homogeneously mix with each other. That is, a larger amount of PFPE can be included without impairing the electrical conductivity of the nonaqueous electrolyte by using PFPE in combination with the fluorinated nitrile. That is, the flame retardancy of the nonaqueous electrolyte is enhanced while maintaining the performance as a nonaqueous electrolyte.

Nonaqueous Electrolyte

The nonaqueous electrolyte according to the present embodiment includes a nonaqueous solvent and an alkali metal salt dissolved in the nonaqueous solvent. The nonaqueous solvent contains PFPE and a fluorinated nitrile (hereafter also referred to as a first polar solvent). The nonaqueous solvent may contain a polar organic solvent other than the fluorinated nitrile (hereafter also referred to as a second polar solvent).

Such a nonaqueous electrolyte has high solubility of an alkali metal salt, and phase separation of PFPE does not occur. Consequently, PFPE serving as a nonaqueous electrolyte may be mixed in any proportion. As a result, the flame retardancy of the nonaqueous electrolyte may be enhanced while maintaining the function as a nonaqueous electrolyte. Therefore, a battery having excellent performance and safety may be realized.

Fluorinated Nitrile

The fluorinated nitrile has an excellent capability of dissolving an alkali metal salt and high compatibility with PFPE because the fluorinated nitrile molecule includes a fluorine atom and a cyano group having strong nucleophilicity. Consequently, the fluorinated nitrile and PFPE are homogeneously mixed with each other and the electrical conductivity is increased. In addition, the fluorinated nitrile enhances a charge-discharge reaction of an active material included in the electrode (in particular, an active material capable of exerting a high voltage of 4 V class). As a result, when a nonaqueous electrolyte containing the fluorinated nitrile is used, the charge-discharge efficiency is improved.

The fluorinated nitrile is denoted by formula (1) described below.

$$R^f\text{—CN} \qquad (1)$$

In the formula, $R^f$ represents a hydrocarbon group which has a carbon number of 2 to 4 and in which at least one hydrogen atom is substituted with fluorine.

$R^f$ may be a saturated hydrocarbon group or an unsaturated hydrocarbon group. $R^f$ may have a structure of a straight chain, may be branched, or may be cyclic. From the viewpoint of compatibility with PFPE, all of the $R^f$ carbons may be fluorinated. When the viscosity is further taken into consideration, $R^f$ may be a trifluoroethyl group.

Perfluoropolyether

There is no particular limitation regarding PFPE as long as at least one unit ($-C_nF_{2n}-O-$) having a structure in which an entirely fluorinated carbon chain is bonded to an oxygen atom is included. In the present embodiment, the fluorinated nitrile is included and, thereby, phase separation of the nonaqueous solvent is suppressed. As a result, PFPE including the above-described unit that contains no hydrogen can be used. Such PFPE has high flame retardancy and relatively low viscosity. Therefore, PFPE is suitable for a nonaqueous electrolytic solution.

In consideration of safety and viscosity, the weight average molecular weight (Mw) of PFPE may be 350 or more and 2,000 or less, and further may be 350 or more and less than 1,100. When the Mw of PFPE is within this range, the boiling temperature is higher than or equal to a common operating temperature (for example, 60° C. or higher) of a battery, safety is enhanced, and viscosity is controlled at a low level.

The weight average molecular weight (Mw) is determined by dividing the sum total of the products of the molecular weight and the weight of the respective molecules by the total weight. Experimentally, Mw is calculated on the basis of a measuring method called gel permeation chromatography (GPC). GPC is one type of liquid chromatography that performs separation based on the difference in molecular size and is a technique used to measure the molecular weight distribution of a compound and the average molecular weight distribution. The Mw of a compound is calculated by combining a GPC measuring device with a light scattering detector.

PFPE is denoted by, for example, general formula (2) described below.

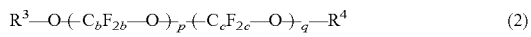

$$R^3-O-(C_bF_{2b}-O)_p-(C_cF_{2c}-O)_q-R^4 \qquad (2)$$

In formula (2), each of $R^3$ and $R^4$ that is an end group may contain an oxygen atom that may be coordinated with an alkali metal ion so that dissolution of an alkali metal salt is facilitated. Each of $R^3$ and $R^4$ that is an end group may contain a fluorine atom so that the flame retardancy is further enhanced. Examples of $R^3$ and $R^4$ include a carboxylic acid ester denoted by $-C_xF_{2x}-C_yH_{2y}-COO-C_zH_{2z+1}$, an alkyl ether denoted by $-C_xF_{2x}-C_yH_{2y}-O-C_zH_{2z+1}$, a carbonic acid ester denoted by $-C_xF_{2x}-C_yH_{2y}-O-COO-C_zH_{2z+1}$, and a perfluoroalkyl group having a carbon number of 1 to 5. The perfluoroalkyl group may have a structure of a straight chain, may be branched, or may be cyclic. $R^3$ and $R^4$ may be the same or different from each other. However, the perfluoroalkyl group may be any one of $R^3$ and $R^4$ provided that the polarity of PFPE is not excessively reduced.

In formula (2), b represents the carbon number of an entirely fluorinated carbon chain in a $[-(C_bF_{2b}-O)-]$ unit (hereafter referred to as a first unit), c represents the carbon number of an entirely fluorinated carbon chain in a $[-(C_cF_{2c}-O)-]$ unit (hereafter referred to as a second unit), each of x, y, and z represents the carbon number of an end group, p and q, b and c, and x, y, and z may be appropriately set such that the Mw of PFPE becomes 350 or more and 2,000 or less. In this regard, each of b and c is, for example, an integer of 1 to 3, and b and c may be the same or different from each other, each of x and y is, for example, an integer of 0 to 3, and x and y may be the same or different from each other, and z is, for example, an integer of 1 to 3.

In formula (2), p represents the number of the first units, q represents the number of the second units, p and q satisfy, for example, p≥0, q≥0, and 1≤p+q≤40, p and q are not limited to integers, and p and q may further satisfy 1≤p+q≤20.

Each of the first unit and the second unit may have a structure of a straight chain or may be branched. Examples of straight chain first units and/or second units include $-(CF_2-O)-$, $-(CF_2CF_2-O)-$, and $-(CF_2CF_2CF_2-O)-$. Examples of branched first units and/or second units include $-(CF(CF_3)CF_2-O)-$, $-(CF_2CF(CF_3)-O)-$, and $-(C(CF_3)_2-O)-$.

In formula (2), both the first unit and the second unit may have a structure of a straight chain or may be branched. Alternatively, one may have a structure of a straight chain and the other may be branched. Examples of combinations of a straight chain first unit and a straight chain second unit include $-(CF_2CF_2CF_2-O-)_p-(CF_2-O-)_q-$, $-(CF_2CF_2-O-)_p-(CF_2-O-)_q-$, and $-(CF_2CF_2CF_2-O-)_p-(CF_2CF_2-O-)_q-$.

Examples of combinations of a branched first unit and a branched second unit include $-(CF_2CF(CF_3)-O-)_p-(CF(CF_3)CF_2-O-)_q-$ and $-(C(CF_3)_2-O-)_p-(CF(CF_3)CF_2-O-)_q-$.

Examples of combinations of a branched first unit and a straight chain second unit include $-(CF(CF_3)CF_2-O-)_p-(CF_2CF_2-O-)_q-$, $-(CF(CF_3)CF_2-O-)_p-(CF_2CF_2CF_2-O-)_q-$, and $-(CF_2CF(CF_3)-O-)_p-(CF_2CF_2-O-)_q-$.

When neither p nor q is 0, the first units and the second units may be regularly arranged or randomly arranged, or blocks of the first units and blocks of the second units may be arranged.

When each of $R^3$ and $R^4$ is a carboxylic acid ester denoted by $-C_xF_{2x}-C_yH_{2y}-COO-C_zH_{2z+1}$, x=2, y=0, and z=1 are satisfied, and in formula (2), b=3, c=3, and 1≤p+q≤20 are satisfied. Use of such PFPE easily realizes an effect of enhancing compatibility with a polar organic solvent due to the fluorinated nitrile.

When each of $R^3$ and $R^4$ is an alkyl ether denoted by $-C_xF_{2x}-C_yH_{2y}-O-C_zH_{2z+1}$, from the same viewpoint, x=2, y=1, and z=1 are satisfied, and in formula (2), b=3, c=3, and 1≤p+q≤20 are satisfied.

When each of $R^3$ and $R^4$ is a carbonic acid ester denoted by $-C_xF_{2x}-C_yH_{2y}-O-COO-C_zH_{2z+1}$, from the same viewpoint, x=2, y=1, and z=1 are satisfied, and in formula (2), b=3, c=3, and 1≤p+q≤20 are satisfied.

The nonaqueous solvent may contain one type of PFPE or may contain at least two types of PFPE having compositions or structures different from each other.

PFPE may be synthesized by known methods, e.g., a reaction that utilizes photooxidation of a perfluoroolefin and an anionic polymerization reaction of an entirely fluorinated epoxide. Synthesized PFPE may be subjected to precision distillation or column refining so as to produce PFPE having a predetermined Mw.

Second Polar Solvent

There is no particular limitation regarding the second polar solvent as long as the alkali metal salt is dissolved, and examples of the second polar solvent include carbonic acid esters, carboxylic acid esters, phosphoric acid esters, sulfones, and ethers.

Examples of carbonic acid esters include cyclic carbonic acid esters, e.g., propylene carbonate, ethylene carbonate, fluoroethylene carbonate, vinylene carbonate, and vinylethylene carbonate, and chain carbonic acid esters, e.g., diethyl carbonate, ethylmethyl carbonate, and dimethyl carbonate. Examples of carboxylic acid esters include γ-butyrolactone and γ-valerolactone. Examples of phosphoric acid esters include trimethyl phosphate and triethyl phosphate. Examples of sulfones include sulfolane and methylsulfolane. Examples of ethers include cyclic ethers, e.g., 1,3-dioxolane, and chain ethers, e.g., 1,2-dimethoxyethane and 1,2-diethoxyethane. These are used alone, or at least two types are used in combination.

The second polar solvent may be a carbonic acid ester, a carboxylic acid ester, or a phosphoric acid ester from the viewpoint of a high dielectric constant and the solubility of the alkali metal salt. The second polar solvent may be, for example, a cyclic carbonic acid ester. Consequently, the electrical conductivity of the nonaqueous electrolyte is further increased.

Nonaqueous Solvent

The nonaqueous solvent includes PFPE, a fluorinated nitrile, and as necessary, a second polar solvent.

From the viewpoint of flame retardancy and solubility of an alkali metal salt, the volume proportion of PFPE in the nonaqueous solvent may be 20% or more and 50% or less, and further 30% or more and 40% or less. According to the present embodiment, even when the above-described volume proportion of PFPE is 20% or more, phase separation of the nonaqueous solvent is suppressed. Therefore, high electrical conductivity can be maintained while enhancing the flame retardancy of a nonaqueous electrolyte.

From the viewpoint of suppressing phase separation of the nonaqueous solvent and solubility of an alkali metal salt, the volume ratio of the fluorinated nitrile to PFPE may be 0.3 or more and 3 or less, and may be 0.5 or more and 2 or less.

From the viewpoint of the solubility of an alkali metal salt, the volume proportion of the polar organic solvent in the nonaqueous solvent (the total of the fluorinated nitrile and the second polar solvent) may be 10% or more, and further 40% or more. From the viewpoint of flame retardancy, the volume proportion of the polar organic solvent in the nonaqueous solvent may be 90% or less, and further 80% or less.

Alkali Metal Salt

The alkali metal salt is composed of an alkali metal cation and an anion and is denoted by the formula MX. In the formula MX, M represents an alkali metal, examples of which include Na, Li, K, Rb, and Cs.

Examples of X in the formula MX include Cl, Br, I, $BF_4$, $PF_6$, $CF_3SO_3$, $ClO_4$, $CF_3CO_2$, $AsF_6$, $SbF_6$, $AlCl_4$, $N(CF_3SO_2)_2$, $N(FSO_2)_2$, $N(CF_3CF_2SO_2)_2$, and $N(CF_3SO_2)(FSO_2)$. From the viewpoint of chemical stability, X may be $BF_4$, $PF_6$, $ClO_4$, $N(CF_3SO_2)_2$, or $N(CF_3CF_2SO_2)_2$. From the viewpoint of solubility, X may be $N(CF_3SO_2)_2$, $N(FSO_2)_2$, $N(CF_3CF_2SO_2)_2$, or $N(CF_3SO_2)(FSO_2)$. These may be used alone, or at least two types may be used in combination.

There is no particular limitation regarding the concentration of the alkali metal salt, and from the viewpoint of electrical conductivity, the concentration may be adjusted so as to satisfy alkali metal salt/nonaqueous solvent=1/2 to 1/20 (molar ratio).

Battery

A battery according to the present embodiment includes the above-described nonaqueous electrolyte, a positive electrode, and a negative electrode. The nonaqueous electrolyte, the positive electrode, and the negative electrode are accommodated in a case with a bottom or are laminated by a film material. The battery may be a primary battery or a secondary battery.

Positive Electrode

The positive electrode contains a positive electrode active material that can occlude and release alkali metal cations.

Such a positive electrode is produced by, for example, forming a positive electrode mix containing the positive electrode active material into the shape of a disk. Alternatively, the positive electrode is produced by making a positive electrode collector hold a layer containing the positive electrode mix (positive electrode mix layer).

The positive electrode mix layer may be held on the positive electrode collector by mixing the positive electrode mix and a liquid component so as to make a slurry, coating the surface of the positive electrode collector with the resulting slurry, and performing drying. The positive electrode mix layer may include a conductive auxiliary agent, an ionic conductor, a binder, and the like. A carbon material, e.g., carbon, may be interposed between the positive electrode collector and the positive electrode mix layer. Consequently, a reduction in the resistance value, a catalyst effect, enhancement of, for example, adhesion between the positive electrode mix layer and the positive electrode collector, and the like are expected. There is no particular limitation regarding the thickness of the positive electrode collector, and the thickness may be, for example, 5 to 300 μm. There is no particular limitation regarding the thickness of the positive electrode mix layer, and the thickness may be, for example, 30 to 300 μm.

Regarding the positive electrode active material, when the alkali metal is lithium, a known material that can occlude and release lithium ions is used. Examples of positive electrode active materials include transition metal oxides, lithium-containing transition metal oxides, lithium-transition metal phosphoric acid compounds ($LiFePO_4$ and the like), and lithium-transition metal sulfuric acid compounds ($Li_xFe_2(SO_4)_3$ and the like).

Examples of transition metal oxides include cobalt oxides, nickel oxides, manganese oxides, vanadium oxides represented by vanadium pentoxide ($V_2O_5$), and complex oxides of these transition metals. Examples of lithium-containing transition metal oxides include lithium-manganese complex oxides ($LiMn_2O_4$ and the like), lithium-nickel complex oxides ($LiNiO_2$ and the like), lithium-cobalt complex oxides ($LiCoO_2$ and the like), lithium-iron complex oxides ($LiFeO_2$ and the like), lithium-nickel-cobalt-manganese complex oxides ($LiNi_{0.5}Co_{0.2}Mn_{0.3}O_2$, $LiNi_{1/3}Co_{1/3}Mn_{1/3}O_2$, $LiNi_{0.4}Co_{0.2}Mn_{0.4}O_2$, and the like), lithium-nickel-cobalt-aluminum complex oxides ($LiNi_{0.8}Co_{0.15}Al_{0.05}O_2$, $LiNi_{0.8}Co_{0.18}Al_{0.02}O_2$, and the like), lithium-nickel-manganese complex oxides ($LiNi_{0.5}Mn_{0.5}O_2$ and the like), and lithium-nickel-cobalt complex oxides ($LiNi_{0.8}Co_{0.2}O_2$ and the like). From the viewpoint of energy density, the positive electrode active material may be a lithium-cobalt complex oxide, a lithium-nickel-cobalt-manganese complex oxide, or a lithium-nickel-cobalt-aluminum complex oxide.

Regarding the positive electrode active material, when the alkali metal is sodium, a known material that can occlude and release sodium ions is used. Examples of positive electrode active materials include transition metal oxides, sodium-containing transition metal oxides, sodium-transition metal phosphoric acid compounds ($NaFePO_4$ and the like), and sodium-transition metal sulfuric acid compounds ($Na_xFe_2(SO_4)_3$ and the like).

Examples of transition metal oxides include the same materials as those described as transition metal oxides that can occlude and release lithium ions. Examples of sodium-containing transition metal oxides include sodium manganate ($NaMnO_2$), sodium chromite ($NaCrO_2$), and sodium iron manganate ($Na_{2/3}Fe_{1/3}Mn_{2/3}O_2$).

Examples of positive electrode collectors include a sheet (foil, mesh, or the like) or film that contains a metal material, e.g., aluminum, stainless steel, titanium, or an alloy thereof. From the viewpoint of cost, the positive electrode collector may be a sheet containing aluminum or an alloy thereof. The positive electrode collector may be porous or nonporous.

A conductive auxiliary agent is used to reduce the resistance of the positive electrode. Examples of conductive auxiliary agents include carbon materials, e.g., carbon black, graphite, and acetylene black, and conductive polymers, e.g., polyanilines, polypyrroles, and polythiophenes. The amount of the conductive auxiliary agent included in the positive electrode mix is, for example, 5 to 30 parts by mass relative to 100 parts by mass of the positive electrode active material.

An ionic conductor is used to reduce the resistance of the positive electrode. Examples of ionic conductors include gel electrolytes, e.g., polymethyl methacrylate, and solid electrolytes, e.g., polyethylene oxide. The amount of the ionic conductor included in the positive electrode mix is, for example, 5 to 30 parts by mass relative to 100 parts by mass of the positive electrode active material.

A binder is used to improve the binding properties of a material included in the positive electrode mix layer. Examples of binders include polyvinylidene fluorides, vinylidene fluoride-hexafluoropropylene copolymers, vinylidene fluoride-tetrafluoroethylene copolymers, polytetrafluoroethylenes, carboxymethyl cellulose, polyacrylic acids, styrene-butadiene copolymer rubbers, polypropylenes, polyethylenes, and polyimides. The amount of the binder included in the positive electrode mix is, for example, 3 to 15 parts by mass relative to 100 parts by mass of the positive electrode active material.

Negative Electrode

The negative electrode contains a negative electrode active material that can occlude and release alkali metal cations. Alternatively, the negative electrode contains a material that can dissolve or precipitate an alkali metal serving as a negative electrode active material.

Such a negative electrode may be formed by, for example, stamping an alkali metal simple substance and/or an alkali metal alloy into a predetermined shape and performing contact bonding to a negative electrode collector. Alternatively, the negative electrode is formed by performing electrodeposition, evaporation, or the like of an alkali metal simple substance and/or an alkali metal onto the negative electrode collector. Further, in the same manner as for the positive electrode, the negative electrode is produced by making a negative electrode collector hold a layer of a negative electrode mix containing a negative electrode active material (negative electrode mix layer). There is no particular limitation regarding the thickness of the negative electrode collector, and the thickness is, for example, 5 to 300 µm. Also, there is no particular limitation regarding the thickness of the negative electrode mix layer, and the thickness is, for example, 30 to 300 µm. The negative electrode mix layer may include the above-described conductive auxiliary agent, ionic conductor, binder, and the like. A carbon material, e.g., carbon, may be interposed between the negative electrode collector and the negative electrode mix layer.

When the alkali metal is lithium, examples of negative electrode active materials include a metal lithium simple substance, lithium alloys, silicon, silicon alloys, nongraphitizable carbon, and lithium-containing metal oxides. Examples of nongraphitizable carbon include graphite, hard carbon, and coke. Examples of lithium-containing metal oxides include lithium titanate ($Li_4Ti_5O_{12}$). Lithium alloys are alloys containing lithium and an element Y other than lithium. The element Y is, for example, silicon, tin, or aluminum. The content of the element Y included in the lithium alloy may be 20% or less on an atomic ratio basis.

When the alkali metal is sodium, examples of negative electrode active materials include a metal sodium simple substance, sodium alloys, silicon, silicon alloys, nongraphitizable carbon, and sodium-containing metal oxides. Examples of nongraphitizable carbon include the same materials as those described as nongraphitizable carbon that can occlude and release lithium ions. Examples of sodium-containing metal oxides include sodium titanate ($Na_2Ti_3O_7$, $Na_4Ti_5O_{12}$). Sodium alloys are alloys containing sodium and an element Z other than sodium. The element Z is, for example, tin, germanium, zinc, bismuth, or indium. The content of the element Z included in the sodium alloy may be 20% or less on an atomic ratio basis.

Examples of negative electrode collectors include a sheet (foil, mesh, or the like) or film that contains a metal material (e.g., aluminum, stainless steel, nickel, copper) or an alloy thereof. From the viewpoint of cost, the negative electrode collector may be a sheet containing aluminum or an alloy thereof. The negative electrode collector may be porous or nonporous.

Separator

The battery according to the present embodiment may further include a separator.

Examples of separators include porous films formed of polyethylene, polypropylene, glass, cellulose, and ceramic. Pores of the porous film are impregnated with the nonaqueous electrolyte.

The separator may be composed of a heat-resistant material having a heat-resistance temperature of 250° C. or higher. The heat-resistance temperature is experimentally defined as a temperature TH at which heat absorption or heat generation occurs in association with a structural change of a heat-resistant material on the basis of TG/DTA measurement. TG/DTA measurement is a technique to detect thermal changes as temperature differences relative to a reference substance, where the thermal changes occur in a sample of the heat-resistant material, which is the target of the measurement, due to physical changes and chemical changes when the sample is heated or cooled. In this regard, the temperature TH, at which heat absorption or heat generation occurs, may be specified as a temperature at which the rate of change obtained by differentiating a curve that indicates the amount of heat absorption or heat generation shows a peak.

The nonaqueous solvent contains PFPE, and the heat-resistant material constituting the separator has a heat-resistance temperature of 250° C. or higher. Consequently, an exothermic reaction chain does not readily occur even under the circumstances where a decomposition reaction of the positive electrode active material proceeds.

The separator includes, for example, a fiber assembly or a microporous film that is composed of a heat-resistant material having a heat-resistance temperature of 250° C. or higher. The fiber assembly is a material such as a nonwoven fabric or a woven fabric that is composed mainly of fibers. The fiber assembly may include additives, e.g., a powder and a binder, in a proportion of, for example, 10% by mass or less in addition to fibers. The microporous film refers to a film having fine pores. The fine pores may be formed by, for example, drawing a film or removing a pore-forming material included in a film in advance.

Examples of heat-resistant materials having a heat-resistance temperature of 250° C. or higher include at least one selected from the group consisting of glass, polyamide, polybutylene terephthalate, polyethylene terephthalate, polyimide, fluororesin, cellulose, polyether imide, and polyphenylene sulfide. The heat-resistant material may be at least one selected from the group consisting of polyimide, aramid (aromatic polyamide: heat-resistance temperature of 278° C.), glass (heat-resistance temperature of 286° C.), cellulose (heat-resistance temperature of 285° C.), and polyethylene terephthalate (PET) (heat-resistance temperature of 254° C.).

The separator may further include inorganic particles. There is no particular limitation regarding the method of introducing inorganic particles into the separator. For example, inorganic particles may be accommodated into some of gaps included in the fiber assembly or may be attached to the fibers. Alternatively, inorganic particles may be incorporated into the microporous film, or a layer including inorganic particles may be formed on the surface of the microporous film or the fiber assembly.

The average particle diameter of the inorganic particles may be sufficiently smaller than the thickness of the separator and may be, for example, 2 μm or more and 5 μm or less. The average particle diameter may be determined as an average value of maximum diameters of 20 randomly selected inorganic particles observed in a transmission electron micrograph (TEM) of a cross section of the separator.

There is no particular limitation regarding the material for the inorganic particles, and the material may be at least one selected from the group consisting of ceramics and metal oxides. More specifically, alumina, silica, and the like may be used.

The thickness of the separator is appropriately selected in accordance with the size of the battery, and the thickness may be, for example, 10 μm or more and 35 μm or less.

The separator may be a freestanding independent film that can be peeled from the positive electrode and the negative electrode or may be a non-independent film that is fixed to the surface of the positive electrode and/or the surface of the negative electrode and that is integrated with the positive electrode and/or the negative electrode. Examples of non-independent films include a coating film attached to an electrode surface.

FIGURE is a schematic sectional view showing a battery (secondary battery) according to the present embodiment.

A battery 10 includes a nonaqueous electrolyte which is not shown in the drawing, a positive electrode 11, and a negative electrode 12. The battery 10 is a laminate-type battery, and the nonaqueous electrolyte, the positive electrode 11, and the negative electrode 12 are laminated by a film-like outer jacket 14.

The positive electrode 11 and the negative electrode 12 are opposed to each other with a separator 13 interposed therebetween so as to constitute an electrode group. The positive electrode 11 includes a positive electrode collector 111 and a positive electrode mix layer 112 held on the positive electrode collector 111. The negative electrode 12 includes a negative electrode collector 121 and a negative electrode mix layer 122 held on the negative electrode collector 121. A positive electrode lead terminal 15 is connected to the positive electrode collector 111. The positive electrode lead terminal 15 extends outside the outer jacket 14. Likewise, a negative electrode lead terminal 16 is connected to the negative electrode collector 121. The negative electrode lead terminal 16 extends outside the outer jacket 14.

EXAMPLES

The nonaqueous electrolyte according to an aspect of the present disclosure will be described below in detail with reference to the examples. However, the present disclosure is not limited to the following examples.

The homogeneity and the electrical conductivity of the nonaqueous electrolyte were evaluated.

Example 1

A nonaqueous solvent was produced by mixing PFPE, a fluorinated nitrile (second solvent), and a carbonic acid ester (third solvent), described below, in a ratio shown in Table 1. Nonaqueous electrolyte A was produced by dissolving lithium hexafluorophosphate ($LiPF_6$, alkali metal salt) into the nonaqueous solvent such that the concentration became 1 percent by mole. Nonaqueous electrolyte A was prepared in an argon glove box.

A compound (perfluoro(2,5-dimethyl-3,6-dioxanonanoic acid), methyl carbonate, Mw: 525) denoted by formula (2a) was used as PFPE.

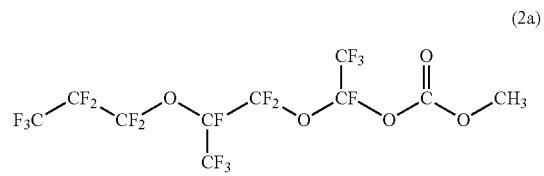

(2a)

Trifluoropropionitrile (TFPN, $R^f$=$CF_3$—$CH_2$—) was used as the second solvent (fluorinated nitrile).

A mixture of fluoroethylene carbonate (FEC) and dimethyl carbonate (DMC) where FEC:DMC=1:4 (volume ratio) was used as the third solvent.

The homogeneity of the resulting nonaqueous electrolyte A was visually evaluated. When precipitation of the alkali salt and/or phase separation of the solvents from each other was observed, the rating was "poor". When neither precipitation of the alkali salt nor phase separation of the solvents from each other was observed, the rating was "good". In addition, the electrical conductivity at 25° C. was measured. The evaluation results are collectively shown in Table 1.

Example 2

Nonaqueous electrolyte B was prepared in the same manner as in example 1 except that the mixing ratio of each solvent was changed, and the evaluation was performed. The mixing ratio of each solvent and the evaluation result are shown in Table 1.

Example 3

Nonaqueous electrolyte C was prepared in the same manner as in example 1 except that the mixing ratio of each solvent was changed, and the evaluation was performed. The mixing ratio of each solvent and the evaluation result are shown in Table 1.

Example 4

Nonaqueous electrolyte D was prepared in the same manner as in example 1 except that the mixing ratio of each solvent was changed, and the evaluation was performed. The mixing ratio of each solvent and the evaluation result are shown in Table 1.

Example 5

Nonaqueous electrolyte E was prepared in the same manner as in example 1 except that a compound (perfluoro (2,5-dimethyl-3,6-dioxanonanoic acid), methyl ester, CAS No. 26131-32-8, Mw: 509) denoted by formula (2b) was used as PFPE, and the evaluation was performed. The mixing ratio of each solvent and the evaluation result are shown in Table 1.

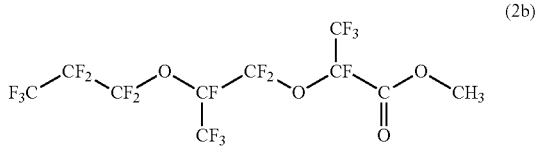

(2b)

Comparative Example 1

Nonaqueous electrolyte a was prepared in the same manner as in example 1 except that the fluorinated nitrile (second solvent) was not used and the mixing ratio of the carbonic acid ester and PFPE was changed, and the evaluation was performed. The mixing ratio of each solvent and the evaluation result are shown in Table 1.

Comparative Example 2

Nonaqueous electrolyte b was prepared in the same manner as in example 1 except that propionitrile (PN) was used as the second solvent instead of the fluorinated nitrile, and the evaluation was performed. The mixing ratio of each solvent and the evaluation result are shown in Table 1.

Comparative Example 3

Nonaqueous electrolyte c was prepared in the same manner as in example 1 except that dimethoxyethane (DME) was used as the second solvent instead of the fluorinated nitrile, and the evaluation was performed. The mixing ratio of each solvent and the evaluation result are shown in Table 1.

Comparative Example 4

Nonaqueous electrolyte d was prepared in the same manner as in example 1 except that acetonitrile (AN) was used as the second solvent instead of the fluorinated nitrile, and the evaluation was performed. The mixing ratio of each solvent and the evaluation result are shown in Table 1.

Comparative Example 5

Nonaqueous electrolyte e was prepared in the same manner as in example 2 except that acetonitrile (AN) was used as the second solvent instead of the fluorinated nitrile, and the evaluation was performed. The mixing ratio of each solvent and the evaluation result are shown in Table 1.

Comparative Example 6

Nonaqueous electrolyte f was prepared in the same manner as in example 3 except that acetonitrile (AN) was used as the second solvent instead of the fluorinated nitrile, and the evaluation was performed. The mixing ratio of each solvent and the evaluation result are shown in Table 1.

Comparative Example 7

Nonaqueous electrolyte g was prepared in the same manner as in example 4 except that acetonitrile (AN) was used as the second solvent instead of the fluorinated nitrile, and the evaluation was performed. The mixing ratio of each solvent and the evaluation result are shown in Table 1.

Comparative Example 8

Nonaqueous electrolyte h was prepared in the same manner as in example 5 except that acetonitrile (AN) was used as the second solvent instead of the fluorinated nitrile, and the evaluation was performed. The mixing ratio of each solvent and the evaluation result are shown in Table 1.

TABLE 1

| | Configuration | | | | | |
|---|---|---|---|---|---|---|
| | Solvent type | | Volume ratio of each solvent (%) | | | Electrical |
| Nonaqueous electrolyte | PEPE | First polar solvent | PEPE | First polar solvent | Second polar solvent | Compatibility | conductivity (mS/cm) |
| A | (2a) | TFPN | 20 | 30 | 50 | good | 7.99 |
| B | | | 30 | 30 | 40 | good | 6.47 |
| C | | | 40 | 30 | 30 | good | 4.29 |
| D | | | 50 | 30 | 20 | good | 2.11 |
| E | (2b) | TFPN | 20 | 30 | 50 | good | 7.72 |
| a | (2a) | — | 20 | — | 80 | poor | 0 |
| b | (2a) | PN | 20 | 30 | 50 | poor | 0 |
| c | (2a) | DME | 20 | 30 | 50 | poor | 0 |
| d | (2a) | AN | 20 | 30 | 50 | poor | 0 |
| e | | | 30 | 30 | 40 | poor | 0 |
| f | | | 40 | 30 | 30 | poor | 0 |
| g | | | 50 | 30 | 20 | poor | 0 |
| h | (2b) | AN | 20 | 30 | 50 | poor | 0 |

As shown in Table 1, nonaqueous electrolytes A to E that contained the fluorinated nitrile (TFPN) in addition to PFPE had homogeneity and excellent electrical conductivity, and neither phase separation nor precipitation of the alkali metal salt was observed. On the other hand, regarding nonaqueous electrolytes a to h that did not contain the fluorinated nitrile, phase separation was observed. As a result, nonaqueous electrolytes a to h had no electrical conductivity.

The performance of the battery was evaluated as described below.

Example 6

(1) Production of Positive Electrode

A slurry was produced by dispersing $LiNi_{0.8}Co_{0.18}Al_{0.02}O_2$ (positive electrode active material, hereafter referred to as NCA), acetylene black (conductive auxiliary agent, hereafter referred to as AB), and polyvinylidene fluoride (binder, hereafter referred to as PVDF) into N-methyl-2-pyrrolidone so as to satisfy NCA/AB/PVDF=8/1/1 (weight ratio). One surface of aluminum foil (positive electrode collector) was coated with the resulting slurry, and drying was performed at 105° C. so as to form a positive electrode mix layer. Subsequently, the resulting multilayer body composed of the aluminum foil and the positive electrode mix layer was rolled and stamped into a 20-mm square so as to produce a positive electrode.

(2) Production of Negative Electrode

Lithium metal foil was contact-bonded to a 20-mm square nickel mesh so as to produce a negative electrode.

(3) Production of Battery

The positive electrode and the negative electrode, which were produced as described above, were opposed to each other with a separator (polyethylene microporous film) interposed therebetween so as to produce an electrode group. A laminate-type lithium secondary battery was produced by laminating the electrode group and nonaqueous electrolyte A prepared in example 1 with a film material (multilayer body including a resin layer and an aluminum layer).

(4) Evaluation of Discharge Capacity

The resulting lithium secondary battery was subjected to a charge and discharge test in a constant temperature bath at 25° C. under the following conditions. The charge and discharge test was started from charge, and after suspension for 30 minutes, discharge was performed. A cycle of charge and discharge was repeated three times. A stable charge and discharge operation was established at the third cycle. The discharge capacity of the third cycle was calculated as the value converted to the capacity per gram of positive electrode active material (mAhg$^{-1}$). The results are shown in Table 2.

Charge

Constant-current constant-voltage charge was performed at a current value of 0.1 C rate relative to a theoretical capacity of the positive electrode active material. The upper limit voltage of the charge was set to be 4.2 V. The lower limit current value at constant voltage was set to be 0.05 C rate.

Discharge

The lower limit voltage of discharge was set to be 2.5 V, and discharge was performed at a current value of 0.05 C rate.

Example 7

A lithium secondary battery was produced in the same manner as in example 6 except that nonaqueous electrolyte D prepared in example 4 was used. The charge and discharge test was performed, and the discharge capacity was calculated. The results are shown in Table 2.

Comparative Example 9

A lithium secondary battery was produced in the same manner as in example 6 except that nonaqueous electrolyte i in which LiPF$_6$ was dissolved into a nonaqueous solvent so as to have a concentration of 1 mol/L was used, the nonaqueous solvent being prepared by mixing fluoroethylene carbonate (FEC) and dimethyl carbonate (DMC) where FEC:DMC=1:4 (volume ratio). The charge and discharge test was performed, and the discharge capacity was calculated. The results are shown in Table 2.

TABLE 2

| Nonaqueous electrolyte | Volume proportion of PFPE (%) | Discharge capacity (mAh/g) |
| --- | --- | --- |
| A | 20 | 192 |
| D | 50 | 191 |
| i | 0 | 192 |

As shown in Table 2, the batteries including nonaqueous electrolytes A and D which contained 20 percent by volume or more of PFPE relative to the nonaqueous solvent exhibited the discharge capacities equivalent to the discharge capacity of the battery including nonaqueous electrolyte i that did not contain PFPE. Therefore, it was ascertained that the nonaqueous electrolytic solution according to the present embodiment exhibited electrochemical stability sufficient for withstanding a charge and discharge operation of the battery and provided performance, which stood comparison with the performance of the carbonate-based nonaqueous electrolyte in common use to the battery, by being used in combination with the fluorinated nitrile even when a high proportion of PFPE is included.

As described above, the content of PFPE can be optionally set when PFPE and the fluorinated nitrile are used in combination. As a result, the degree of freedom is increased in the design of the nonaqueous electrolyte and, in addition, the safety of the battery can be enhanced.

Example 8

The performance of a battery, in which the nonaqueous electrolyte according to the present embodiment and the separator including a heat-resistant material having a heat-resistance temperature of 250° C. or higher were used in combination, was examined as described below.

A coin-type cell was produced in the same manner as in example 6 except that the separator was an unwoven fabric of polyethylene terephthalate (PET) (heat-resistance temperature of 254° C.) in which alumina particles were held on the surface and which had a thickness of 20 μm.

The coin-type cell was charged to 4.3 V. The cell in the charged state was disassembled and the positive electrode was taken out. The nonaqueous electrolytic solution was removed by washing, and vacuum drying was performed. A positive electrode piece which included NCA in the charged state and which had a structure of a circle having a diameter of 3.5 mm was obtained by stamping. Meanwhile, a separator piece, which had a structure of a circle having a diameter of 3.5 mm, was obtained from the separator by stamping.

A nonaqueous electrolytic solution was prepared in the same manner as in example 1 except that PFPE, TFPN, and a FEC/DMC mixed solvent were mixed at a volume ratio of 20:50:30.

The positive electrode piece, the separator piece, and the nonaqueous electrolytic solution were sealed into a stainless steel gastight enclosure so as to obtain sample S1.

The thermal stability of sample S1 was evaluated. Specifically, calorimetry was performed by using a differential scanning calorimeter produced by Seiko Instruments Inc. The temperature of sample S1 was increased from room temperature to 600° C. under an Ar gas stream of 30 cm$^3$/min at the temperature increase rate of 10° C./min. The exothermic peak obtained within the range of room temperature to 300° C. was integrated, and the amount of heat generation on a mass of the positive electrode active material basis was determined.

Comparative Example 10

Sample S2 was prepared in the same manner as in example 8 except that the separator was changed to a microporous film composed of polyethylene (heat-resistance temperature of 119° C.), and the amount of heat generation was evaluated.

TABLE 3

| Sample | Heat-resistant material for separator | Nonaqueous electrolytic solution | Amount of heat generation (mJ/mg) |
|---|---|---|---|
| S1 | PET + inorganic particles | PFPE/TFPN/FEC/DMC | 143 |
| S2 | polyethylene | PFPE/TFPN/FEC/EMC | 273 |

As shown in Table 3, the amount of heat generation of example 8 was smaller than the amount of heat generation of comparative example 10. The reason for this is conjectured to be that an exothermic reaction between the positive electrode active material and the nonaqueous electrolytic solution did not readily occur.

What is claimed is:

1. A nonaqueous electrolyte comprising:
a nonaqueous solvent containing
a perfluoropolyether,
wherein the perfluoropolyether is represented by the following formula

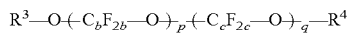

where each of $R^3$ and $R^4$ represents one selected from the group consisting of —$C_xF_{2x}$—$C_yH_{2y}$—COO—$C_zH_{2z+1}$, —$C_xF_{2x}$—$C_yH_{2y}$—O—$C_zH_{2z+1}$, —$C_xF_{2x}$—$C_yH_{2y}$—O—COO—$C_zH_{2z+1}$, and a perfluoroalkyl group having a carbon number of 1 to 5; each of b and c is an integer of 1 to 3; each of x and y is an integer of 0 to 3; z is an integer of 1 to 3; p≥0, q≥0, and 1≤p+q≤40; and one of $R^3$ or $R^4$ is —$C_xF_{2x}$—$C_yH_{2y}$—COO—$C_zH_{2z+1}$ or —$C_xF_{2x}$—$C_yH_{2y}$—O—$C_zH_{2z+1}$;
a nitrile compound represented by a formula $R^f$—CN, where $R^f$ represents a hydrocarbon group which has a carbon number of 2 to 4 and in which at least one hydrogen atom is substituted with fluorine; and
an alkali metal salt dissolved in the nonaqueous solvent.

2. The nonaqueous electrolyte according to claim 1, wherein the nonaqueous solvent further contains a polar organic solvent different from the nitrile compound.

3. The nonaqueous electrolyte according to claim 1, wherein a volume proportion of the perfluoropolyether in the nonaqueous solvent is 20% or more and 50% or less.

4. The nonaqueous electrolyte according to claim 1, wherein a volume proportion of the perfluoropolyether in the nonaqueous solvent is 30% or more and 40% or less.

5. The nonaqueous electrolyte according to claim 1, wherein $R^f$ represents a trifluoroethyl group.

6. The nonaqueous electrolyte according to claim 1, wherein the perfluoropolyether is (perfluoro(2,5-dimethyl-3,6-dioxanonanoic acid) methyl carbonate or (perfluoro(2,5-dimethyl-3,6-dioxanonanoic acid) methyl ester.

7. The nonaqueous electrolyte according to claim 1, wherein the nitrile compound is trifluoropropionitrile.

8. The nonaqueous electrolyte according to claim 1, wherein the perfluoropolyether is (perfluoro(2,5-dimethyl-3,6-dioxanonanoic acid) methyl carbonate or (perfluoro(2,5-dimethyl-3,6-dioxanonanoic acid) methyl ester, and
the nitrile compound is trifluoropropionitrile.

9. A secondary battery comprising:
the nonaqueous electrolyte according to claim 1;
a positive electrode containing a positive electrode active material that can occlude and release alkali metal cations; and
a negative electrode containing a negative electrode active material that can occlude and release alkali metal cations or containing a material that allows alkali metal to be dissolved and precipitate as a negative electrode active material.

10. The secondary battery according to claim 9, further comprising:
a separator disposed between the positive electrode and the negative electrode,
wherein the separator contains a heat-resistant material having a heat-resistance temperature of 250° C. or higher.

11. The secondary battery according to claim 10, wherein the heat-resistant material is a fiber assembly or a microporous film.

12. The secondary battery according to claim 10, wherein the heat-resistant material is at least one selected from the group consisting of glass, polyamide, polybutylene terephthalate, polyethylene terephthalate, polyimide, fluororesin, cellulose, polyether imide, and polyphenylene sulfide.

* * * * *